April 22, 1941. A. H. HABERSTUMP 2,239,318
TRIM SUPPORTING ELEMENT AND METHOD OF ATTACHMENT
Filed Jan. 21, 1939 2 Sheets-Sheet 1
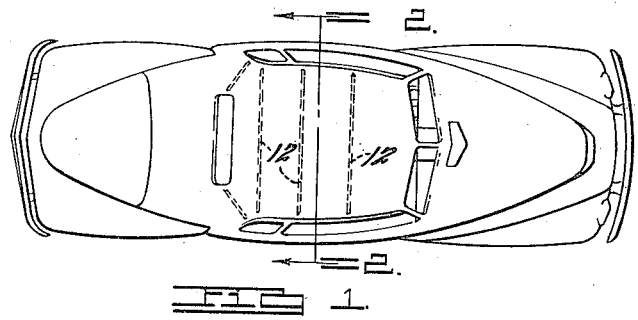
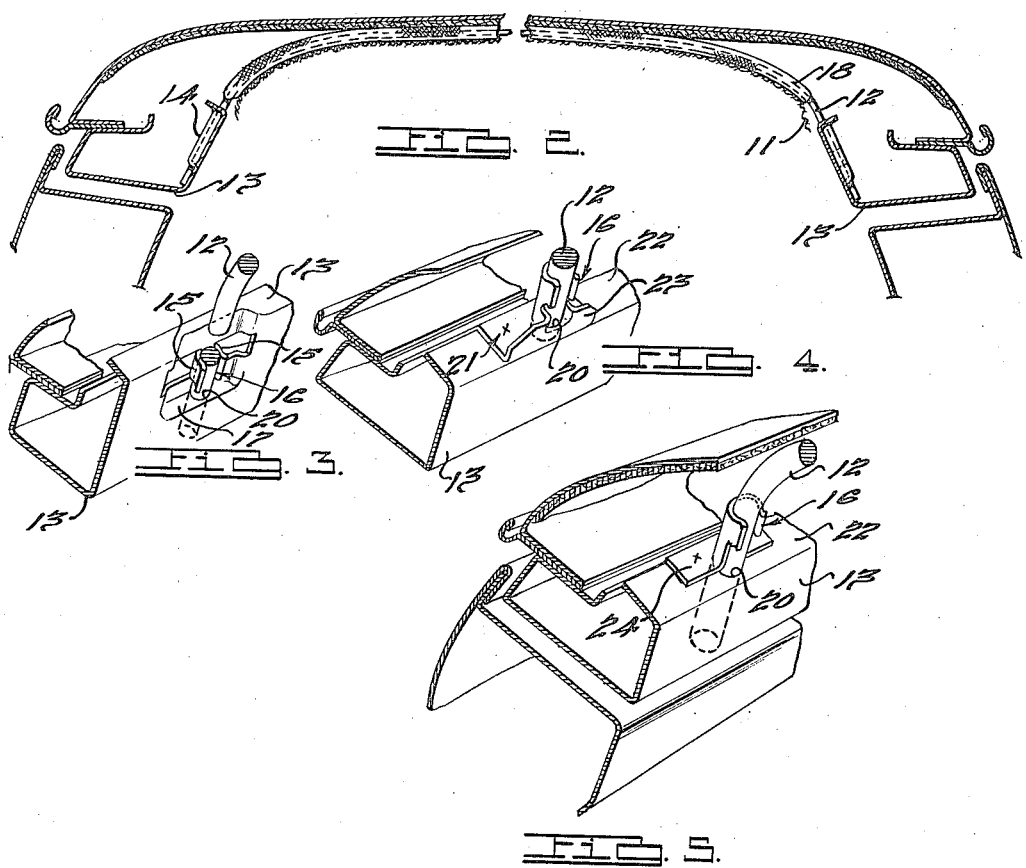
INVENTOR.
Alfred H. Haberstump.
BY
Harness, Dickey & Pierce.
ATTORNEYS.

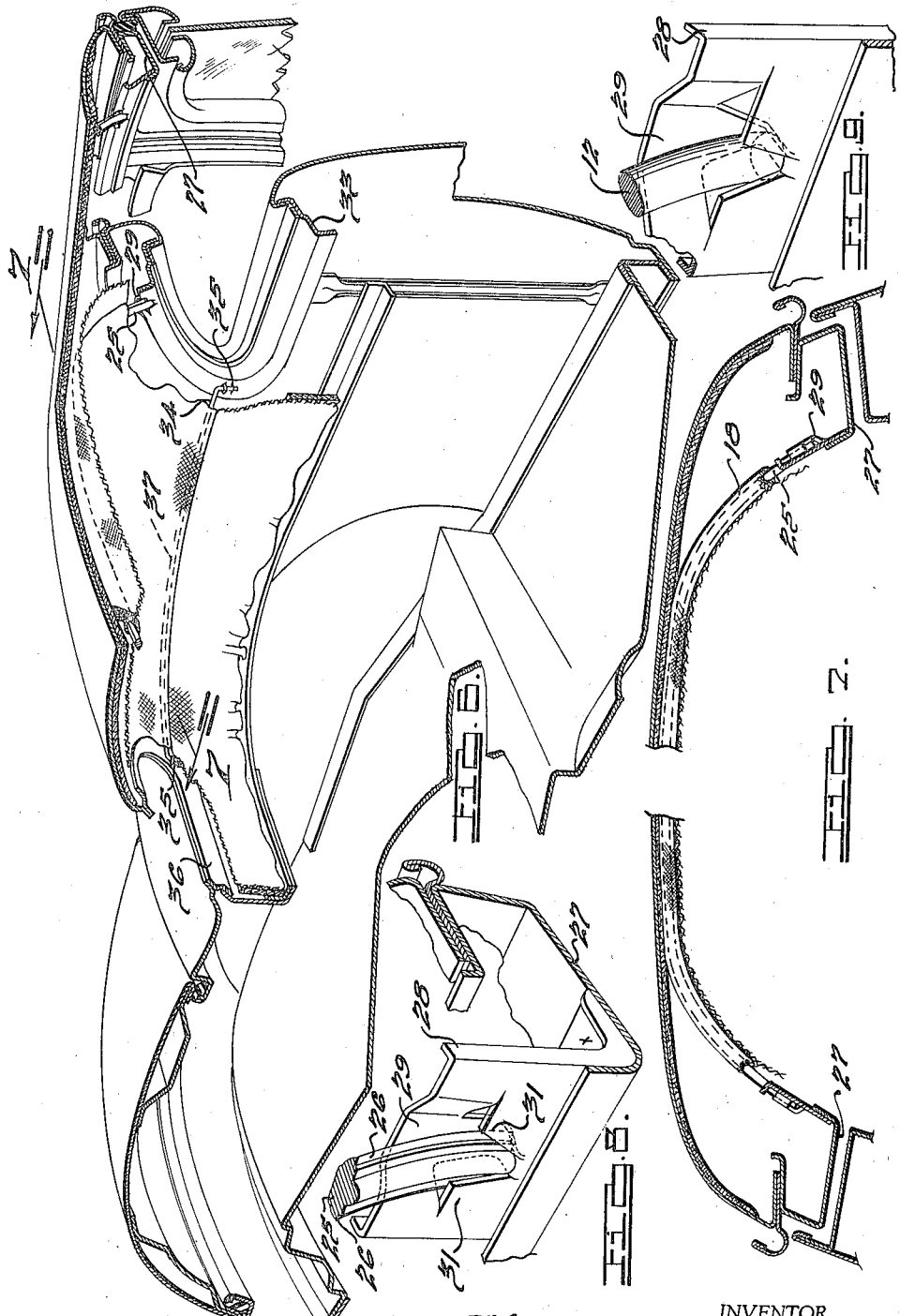

Patented Apr. 22, 1941

2,239,318

UNITED STATES PATENT OFFICE 2,239,318

TRIM SUPPORTING ELEMENT AND METHOD OF ATTACHMENT

Alfred H. Haberstump, Detroit, Mich., assignor to The Murray Corporation of America, Detroit, Mich., a corporation of Delaware Application January 21, 1939, Serial No. 252,056

4 Claims. (Cl. 296—137)

My invention relates to vehicle bodies, and particularly to the inner roof trim supporting elements therefor.

In vehicle bodies such as those for automobiles, the inner surface of the roof is trimmed with a fabric supported on bows which extend arcuately across the top from the roof rails. Such bows were originally made of wood and later made of metal in the form of a channel having tack-receiving strips retained therein. Listing strips were secured to the top side of the trim material and tacked to the wooden bows or the tacking material in the channel elements. To provide arcuate corners between the roof rail and the flat portion of the top the bows were curved downwardly or rods were employed which were bolted to the roof rail and attached to the ends of the bows extending across the central portion of the top. These were fed through hems in the listing strips or otherwise attached thereto when supporting the trim material to provide arcuate corners thereto.

In practicing my present invention, I employ a rod or wire which is arcuately shaped downwardly at the ends and which extends across the top of the body from the side rails. Clips are provided on the rails in various manners for securing the ends of the rods or wires therein. A hem is provided in the listing strip on the top of the trim material through which the wire is threaded and which supports the listing strip and the trim material when the ends are snapped into the sockets provided in the roof rail or in clips welded or otherwise secured thereto.

The sockets may be separate elements shaped to receive the ends of the bow elements under pressure to rigidly support the ends on the rails. The rails themselves may be preformed to have tongues struck therefrom to form clips or sockets into which the ends of the wire or rod may be supported. The rod may be round in cross-section or may be preformed throughout its length or on the ends to form anchoring means with a predetermined shaped socket in the rail or in a clip provided thereon. A plurality of such wires or rods extending from the rails at various points form the front to the rear of the interior of the body providing the necessary support for the trim material which provides a finish to the inner top surface of the panel.

Accordingly, the main objects of my invention are: to provide a bow for supporting the inner trim material of a roof of a vehicle body, having ends which are supported on the roof rails; to provide wires or rods extending from the side roof rails of the vehicle body for supporting the inner roof trim material; to provide releasable sockets on the roof rails of a vehicle body which support bows which extend across the under side of the vehicle roof; to preform a rod which extends across the under-surface of a vehicle roof in such manner as to have the ends anchor within preformed sockets provided on the roof rails; to preform the rails of a vehicle body to form sockets which receive the ends of rods which support the roof trim material on the inside of the body, and in general, to provide means for supporting the trim material under the roof of a vehicle body which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a plan view of a vehicle, the inner trim material for the roof of which is supported by rods from the side rails in a manner embodying my invention;

Fig. 2 is an enlarged broken sectional view of the structure illustrated in Fig. 1, taken on the line 2—2 thereof;

Fig. 3 is an enlarged broken sectional view in perspective of a portion of a roof rail having an end of a supporting bow secured thereto;

Fig. 4 is a view of structure, similar to that illustrated in Fig. 3, showing a modified form thereof;

Fig. 5 is a view of structure similar to that illustrated in Figs. 3 and 4, showing a further form which my invention may assume;

Fig. 6 is a broken perspective view of structure, similar to that illustrated in Fig. 1 disclosing a further form which my invention may assume;

Fig. 7 is a sectional view of the structure illustrated in Fig. 6, taken on the line 7—7 thereof;

Fig. 8 is an enlarged perspective view of a portion of the roof rail illustrated in Fig. 7; and, Fig. 9 is a view of structure, similar to that illustrated in Fig. 8, showing a further form which my invention may assume.

The vehicle illustrated in Fig. 1 has inner trim material 11 secured across the under side of the roof on bows 12 made of wires or rods having their ends anchored to side roof rails 13. The roof rails 13 in Figs. 2 and 3 are illustrated as being preformed by having an inwardly projecting portion 14 from which tongues 15 have been struck out and formed into a spring clip or socket 16 into which the end of the bow 12 may be snapped. The bottom web 17 of the struck-in portion 14 of the rail 13 may be provided with an aperture 20 through which the end of the bow 12 may project to provide further rigidity to the assembly. The trim material 11, as illustrated more clearly in Fig. 2, is provided with a listing strip 18 which is doubled upon itself to form a hem through which the bow 12 may be inserted. The trim material 11 itself may be pleated, as illustrated in Fig. 6, to form the hem through which the bow 12 for supporting the trim material is inserted. After the bows are assembled in the trim material, one end of the bows is inserted in the aperture in the web 17 and in the clip 16 in one of the rails 13 after which the other end of the bow is sprung into the aperture in web 17 and snapped into clip 16 in the opposite rail to retain the bow in fixed relation to the rails below the roof.

In Fig. 4, I have illustrated the roof rail 13 as being provided with separate clips 21 which are welded or otherwise attached to the top flange 22 of the rail. The clip has a vertically extending flange 23 from which the clip 16 is formed above an aperture 20 therebelow. The aperture 20 takes the place of the aperture in the flange 22 and the tongues of the clip 16 spring over the bow 12 when inserted in the aperture 20. In Fig. 5, a clip 24 is illustrated which is similar to clip 21 with the exception that the flange 23 is omitted therefrom and the aperture 20 is provided in the flange 22 of the rail. The clip 16 engages the bow 12 when the end of the bow is inserted through the aperture 20 in the web 22 of the rail and is rigidly retained in position.

In Figs. 6, 7, and 8, I have illustrated a bow 25 which is of predetermined cross-section, having outwardly directed wings 26 at each of its sides. The rail 27 is provided with brackets 28 which are welded or otherwise secured thereto and which have a socket 29 formed therein by deflection of the upper portion of the web of the bracket outwardly of the rail. The brackets are lanced so that the undeflected web portions 31 function as tongues to engage the wings 26 of the bows to retain them locked on the bracket. In Fig. 9, the bracket 28 is illustrated as having the socket 29 supporting the ends of the bow 12 which is round in cross-section.

In any of the foregoing figures, sockets are illustrated as being formed in or attached to side rails of the vehicle body for receiving and rigidly anchoring the ends of the cross bows which support the trim material on the under-side of the vehicle roof. The material is provided with hems at predetermined points throughout the length of the body through which the bows are inserted. When the bows are secured in the sockets on the rails, the material is tensioned longitudinally of the body. The edges of the material are drawn taut about the window openings or the inner side rails of the body where they are glued or otherwise secured to draw the material taut at the sides of the body and at the front and rear ends.

Referring again to Fig. 6, it will be noted that the rearmost bow 25 is secured in a socket 29 provided in the rear window openings a curved rod 34 is employed having its ends bent downwardly and secured in sockets 35 provided in the side window reinforcing element 33 and in the rear window reinforcing element 36. A hem 37 is provided in the material between the windows through which the rod 34 is inserted to support the material along the curved side of the body between the windows.

While I have illustrated and described but a single embodiment of my invention, it will be apparent to those skilled in the art that various changes, additions, omissions, and substitutions may be made therein without departing from the spirit and scope of the invention, as set forth in the accompanying claims.

What is claimed is:

1. In a vehicle body having side rails, a roof spanning said rails having its ends secured thereto, sockets on said side rails embodying a clip disposed above an aperture, and a bow extending across the top of the body below the roof having its ends inserted in said apertures and secured by said clips.

2. In a vehicle body having side rails, sockets on said side rails embodying a clip disposed above an aperture, a bow extending across the top of the body below the roof having its ends inserted in said apertures and secured by said clips, and trim material having a hem on its top side through which the bow extends to support said material.

3. In a vehicle body having side rails, sockets of angular shape having a clip formed in one flange with an aperture therebelow and secured to said rails, and a bow extending across the body below said roof having its ends inserted in said apertures and secured by said clips.

4. In a vehicle body having side and rear windows, reinforcing elements about said windows, sockets formed in said windows, bows of the contour of the side of the body secured in said sockets, and trim material having hems in the side through which said bows extend.

ALFRED H. HABERSTUMP.